(12) United States Patent
Jatekos

(10) Patent No.: US 11,070,656 B2
(45) Date of Patent: Jul. 20, 2021

(54) DEVICE WITH AT LEAST ONE TRANSPARENT COVER

(71) Applicants: Robert Bosch GmbH, Stuttgart (DE); Koninklijke Philips N.V., Eidhoven (NL)

(72) Inventor: Balazs Jatekos, Budapest (HU)

(73) Assignee: TRUMPF PHOTONIC COMPONENTS, GMBH, Ulm (DE)

( * ) Notice: Subject to any disclaimer, the term of this patent is extended or adjusted under 35 U.S.C. 154(b) by 36 days.

(21) Appl. No.: 16/431,074

(22) Filed: Jun. 4, 2019

(65) Prior Publication Data
US 2019/0373089 A1 Dec. 5, 2019

(30) Foreign Application Priority Data
Jun. 5, 2018 (DE) .......................... 102018208781.4

(51) Int. Cl.
| | |
|---|---|
| *H04M 1/00* | (2006.01) |
| *H04M 1/02* | (2006.01) |
| *G01C 3/08* | (2006.01) |
| *A45F 5/00* | (2006.01) |
| *G06F 1/16* | (2006.01) |

(52) U.S. Cl.
CPC .............. *H04M 1/026* (2013.01); *A45F 5/00* (2013.01); *A45F 2200/0516* (2013.01); *G01C 3/08* (2013.01); *G06F 1/1684* (2013.01)

(58) Field of Classification Search
CPC combination set(s) only.
See application file for complete search history.

(56) References Cited

U.S. PATENT DOCUMENTS

| | | |
|---|---|---|
| 2011/0201411 A1 | 8/2011 | Lesley et al. |
| 2016/0178367 A1 | 6/2016 | Tseng et al. |
| 2019/0041904 A1* | 2/2019 | Fletcher ................ H04M 1/026 |
| 2020/0022085 A1* | 1/2020 | Zhang ................ G06K 9/00013 |

FOREIGN PATENT DOCUMENTS

| | | |
|---|---|---|
| CN | 103047547 A | 4/2013 |
| DE | 10053842 A1 | 5/2002 |
| DE | 102005037888 A1 | 7/2006 |
| DE | 10 2012 220 455 A1 | 5/2014 |
| EP | 2337991 A1 | 6/2011 |

OTHER PUBLICATIONS

Translation of DE10053842 provided in the IDS dated Jun. 4, 2019 (Year: 2002).*

* cited by examiner

*Primary Examiner* — Justin Y Lee
(74) *Attorney, Agent, or Firm* — Maginot, Moore & Beck LLP

(57) ABSTRACT

A device includes a housing with a first transparent cover (16) which forms at least a partial area of a first housing wall (18), a printed circuit board (20) arranged in the housing with a functional side (22), and at least one the light-emitting device (24a-24c) arranged on the functional side (22). The first transparent cover (16) is inclined at an angle to the functional side (22) of the printed circuit board (20) and/or to the side directed away from the functional side of the printed circuit board (20), and wherein at least one reflector (26) having a reflective surface (28) is arranged in the housing in such a way that the light emitted by the at least one light-emitting device (24a to 24c) and deflected by means of the at least one reflective surface (28, 42) of the at least one reflector (26, 40) at least partly impinges on the first transparent cover (16) and is at least partly transmitted through the first transparent cover (16).

12 Claims, 4 Drawing Sheets

DEVICE WITH AT LEAST ONE TRANSPARENT COVER

This application claims priority to German Application No. DE 102018208781.4, filed on Jun. 5, 2018. The entire contents of the above-mentioned application are incorporated herein by reference as part of the disclosure of this U.S. application.

The present invention relates to a mobile apparatus having a light-emitting component.

PRIOR ART

The prior art discloses apparatuses comprising at least one light-emitting device in their respective housing, for which reason at least one partial region of a housing wall of the respective housing is formed as a transparent cover for at least one partial spectrum of a light emitted by the at least one light-emitting device.

By way of example, DE 100 53 842 A1 describes a transmitter element for signal generation for an electrical controller comprising a housing having at least one illuminated edge.

Moreover, US 2016/0178367 A1 describes a mobile apparatus comprising an optical sensor device, wherein a "sensing direction" of the light emitted by the optical sensor device and radiated at a front wall of the mobile apparatus is intended to be oriented in an inclined manner with respect to an axis oriented perpendicularly to the front wall. This is done either by means of an outer reflector arranged at the front wall or by means of a fold-out embodiment of a subunit of the mobile apparatus that is equipped with the optical sensor device.

Further examples of apparatuses comprising at least one light-emitting device in their respective housing, wherein at least one partial region of a housing wall of the respective housing is embodied as a transparent cover, are described in DE 10 2012 220 455 A1, EP 2 337 991 B1, US 2011/0201411 A1, CN 103047547 A and DE 10 2005 037 888 A1.

SUMMARY OF THE INVENTION

The present invention provides a mobile apparatus having the features of patent claim 1.

Advantages of the Invention

The present invention facilitates an embodiment of a mobile apparatus comprising a circuit board arranged in its housing, comprising at least one light-emitting device arranged on a functional side of the circuit board, and comprising a first transparent cover forming at least one partial region of a first housing wall of the housing, by virtue of obviating a conventional necessity for arranging the at least one light-emitting device "behind" the first transparent cover. Instead of the conventional arrangement of the at least one light-emitting device "behind" the first transparent cover, in the case of the mobile apparatus according to the invention, the at least one light-emitting device can be arranged in the housing with greater design freedom. The great design freedom in the arrangement of the at least one light-emitting device facilitates an integration of the circuit board equipped therewith into the housing of the mobile apparatus according to the invention. By way of example, the circuit board equipped with the at least one light-emitting device can be mounted on an electronics carrier board that is preferably used for all the electrical components of the mobile apparatus, even though the first transparent cover is oriented in an inclined manner, in particular perpendicularly, with respect to the electronics carrier board.

A use of the present invention likewise obviates the conventional necessity for arranging the first transparent cover "in the emission direction" with respect to the at least one light-emitting device. A position of the first transparent cover at the housing can thus also be chosen more freely. As explained in greater detail below, this in particular also obviates the conventional necessity for forming the first transparent cover at a front wall of the mobile apparatus, the outer surface of which is often also required for fitting at least one input electronic unit of the mobile apparatus, such as e.g. at least one operating button, a keyboard, at least one rotary switch and/or a touch-sensitive screen. In the case of the mobile apparatus according to the invention, the embodiment of the first transparent cover at the housing therefore does not hinder an often desired large-area embodiment of the at least one input electronic unit.

In one advantageous embodiment, the mobile apparatus comprises a freeform reflector as its at least one reflector, wherein the freeform reflector is arranged at or adjacent to the functional side of the circuit board in such a way that the light emitted by the at least one light-emitting device impinges on the reflective surface of the freeform reflector. By means of the freeform reflector, the light emitted by the at least one light-emitting device is not only able to be at least partly deflected onto the first transparent cover, but rather is optionally also able to be focused with a relatively freely selectable focal length at a distance from the first transparent cover outside the housing of the mobile apparatus. As will be explained in greater detail below, the light emitted by the at least one light-emitting device can thus be used diversely, for example for a sensor system.

As an advantageous development, the mobile apparatus, in addition to the freeform reflector, also can comprise a planar reflector as its at least one reflector, wherein the planar reflector is arranged in such a way that its planar reflective surface is oriented parallel to the functional side of the circuit board, and at least one light beam of the light reflected at the reflective surface of the freeform reflector impinges on the planar reflective surface of the planar reflector. As will be explained in greater detail below, the use of the planar reflector additionally increases the design freedom in the arrangement of the at least one light-emitting device and the first transparent cover.

By way of example, the reflective surface of the freeform reflector can be mirror-symmetrical relative to a plane of symmetry oriented perpendicularly to the functional side of the circuit board, and wherein the mobile apparatus comprises at least one first light-emitting device and one second light-emitting device as its at least one light-emitting device arranged on the functional side of the circuit board, and the first light-emitting device is arranged mirror-symmetrically with respect to the second light-emitting device relative to the plane of symmetry. In this way, it is possible to ensure that a first light beam emitted by the first light-emitting device and reflected at least at the reflective surface of the freeform reflector is oriented, relative to the plane of symmetry, mirror-symmetrically with respect to a second light beam emitted by the second light-emitting device and reflected at least at the reflective surface of the freeform reflector.

As an additional development, the mobile apparatus can additionally also comprise a third light-emitting device as its at least one light-emitting device arranged on the functional side of the circuit board, and the plane of symmetry can extend centrally through the third light-emitting device. Preferably, in this case, the reflective surface of the freeform reflector is shaped in such a way that a third light beam emitted by the third light-emitting device and reflected at least at the reflective surface of the freeform reflector is at a smaller inclination angle with respect to the functional side of the circuit board than the first light beam and the second light beam. As will be explained in greater detail below, at least three differently oriented light beams can thus also be emitted into the external surroundings of the mobile apparatus. This likewise increases a possibility of use of the at least three light beams for a sensor system.

Preferably, the first transparent cover is oriented perpendicularly to the functional side of the circuit board. The first transparent cover can thus be formed without any problems at a "side wall" as the first housing wall of the housing, while a "front wall" of the housing is used for example for at least one large-area input electronic unit.

As an advantageous development, the housing can also have a second transparent cover, which forms at least one partial region of a second housing wall of the housing, wherein the second housing wall is formed in an inclined manner with respect to the first housing wall. The second transparent cover, too, can be oriented in a manner inclined by an angle with respect to the functional side of the circuit board and/or can be arranged on that side of the circuit board which is directed away from the functional side of the circuit board, and the light emitted by the at least one light-emitting device and reflected by means of the at least one reflective surface of the at least one reflector can nevertheless at least partially impinge on the second transparent cover and can be at least partly transmitted through the second transparent cover.

By way of example, the second transparent cover can be arranged on that side of the circuit board which is directed away from the functional side of the circuit board, and can be oriented parallel to the functional side of the circuit board. This allows for example an embodiment of the second transparent cover at a "rear wall" of the mobile apparatus as the second housing wall. This embodiment of the present invention thus affords a possibility for using the "rear wall" for relieving the load on the "front wall" of the mobile apparatus.

As already explained above, in the case of the mobile apparatus according to the invention, the at least one operating button, the keyboard, the at least one rotary switch and/or the touch-sensitive screen can be embodied with large area relatively without any problems.

BRIEF DESCRIPTION OF THE DRAWINGS

Further features and advantages of the present invention are explained below with reference to the figures, in which.

DETAILED DESCRIPTION OF THE INVENTION

FIGS. 1a to 1e show schematic partial illustrations and cross sections of a first embodiment of the mobile apparatus.

Figure 1A:
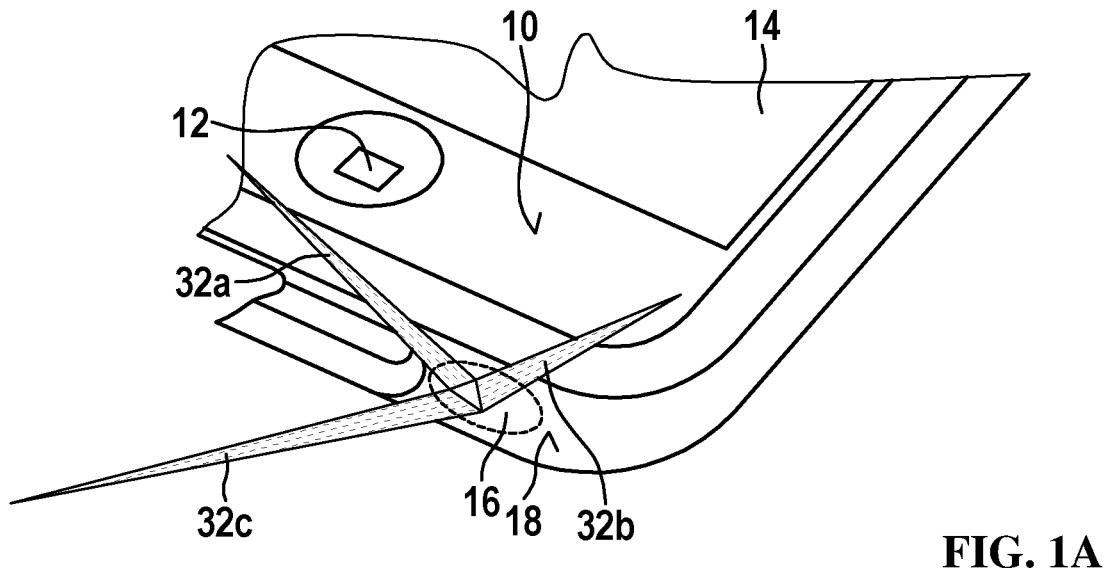
FIGS. 1a to 1e show schematic illustrations and cross sections of a first embodiment of the mobile apparatus.

The mobile apparatus partly illustrated schematically in FIG. 1a is a smartphone, in particular. It is pointed out, however, that an implementability of the mobile apparatus is not restricted to this type of mobile apparatus. By way of example, the mobile apparatus can also be a cellular phone, a tablet, a Kindle or an iPod.

The mobile apparatus has a housing having a housing wall designated as front wall 10, on which at least one operating button 12 and a touch-sensitive screen 14 are formed. However, the equipment of the mobile apparatus with the at least one operating button 12 and the touch-sensitive screen 14 on its front wall 10 should be interpreted as merely by way of example. By way of example, the mobile apparatus 10 can also be equipped with a keyboard and/or at least one rotary switch, in particular on its front wall 10. A rear wall (not illustrated) of the mobile apparatus, which is directed away from the front wall 10, can be embodied as a support surface of the mobile apparatus.

The housing of the mobile apparatus has a first transparent cover 16, which forms at least one partial region of a further housing wall of the housing, said further housing wall being designated as side wall 18. The formation of the first transparent cover 16, the function of which will also be described below, at the side wall 18 does not restrict a design freedom in the formation of the front wall 10. Consequently, by way of example, the at least one operating button 12 and the touch-sensitive screen 14 can be embodied with a comparatively large area in relation to a total area of the front wall 10 without any problems. At the same time it is ensured that a user of the mobile apparatus, who generally looks principally at the front side 10, is scarcely bothered by the first transparent cover 16.

The side wall 18 is oriented in a manner inclined (by an angle ≠0° and ≠180°) with respect to the front wall 10. The side wall 18 can be oriented in particular perpendicularly to the front wall 10. The side wall 18 equipped with the first transparent cover 16 can be embodied specifically as an "edge wall" of the mobile apparatus. Even in the case of a relatively narrow embodiment of the mobile apparatus, with a comparatively small distance between the front wall 10 and the rear wall (not illustrated), the first transparent cover 16 can lie at the side wall 18.

Figure 1B:
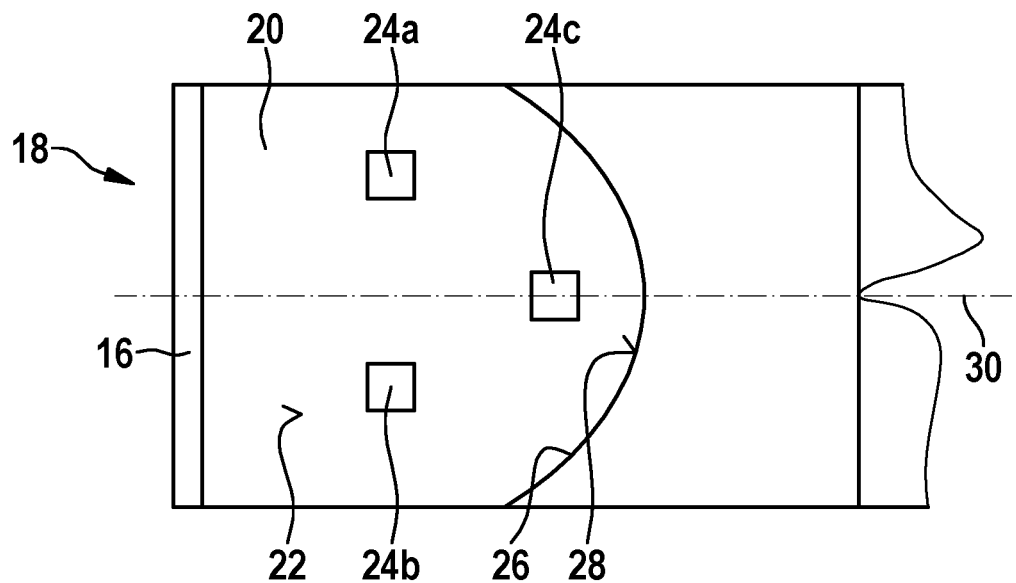

FIG. 1b shows a partial cross section through the mobile apparatus in a plane oriented parallel to the front wall 10 and perpendicularly to the side wall 18. It is evident that a circuit board 20 is arranged in the housing of the mobile apparatus, and that side of said circuit board which is oriented toward the front wall 10 is designated hereinafter as functional side 22. The circuit board 20 can be for example a PCB (Printed Circuit Board) or an ASIC (Application-Specific Integrated Circuit).

Preferably, the circuit board 20/its functional side 22 is oriented parallel to the front wall 10. Such an orientation of the circuit board 20/its functional side 22 is advantageous since, in a large number of apparatus types, the extents of the front wall 10 are significantly larger than the distance between the front wall 10 and the rear wall (not illustrated). Such an embodiment of the mobile apparatus is intended for example frequently to facilitate for a user an input to the mobile apparatus by means of actuating the at least one operating button 12 and/or the touch-sensitive screen 14. The orientation of the circuit board 20/its functional side 22 parallel to the front wall 10 therefore facilitates an arrangement of the circuit board 20 in the housing even in the case of a comparatively large-area functional side 22. The circuit board 20 oriented parallel to the front wall 10 can be mounted e.g. without problems on an electronics carrier board (not illustrated) of the mobile apparatus 10, which is preferably used for all electrical components of the mobile apparatus 10.

At least one light-emitting device 24a to 24c designed for emitting light is arranged on the functional side 22 of the circuit board 20. The first transparent cover 16 is transparent/transmissive to at least one partial spectrum of the light emitted by the at least one light-emitting device 24a to 24c. The partial spectrum to which the first transparent cover 16 is transparent can be e.g. in the visible spectrum and/or in the infrared range, specifically in the near infrared range (i.e. around 850 nm). The first transparent cover 16 can be embodied as a "light window" or as a "transparent housing wall component." The first transparent cover 16 can be composed e.g. of glass and/or at least one plastic.

Figure 1C:
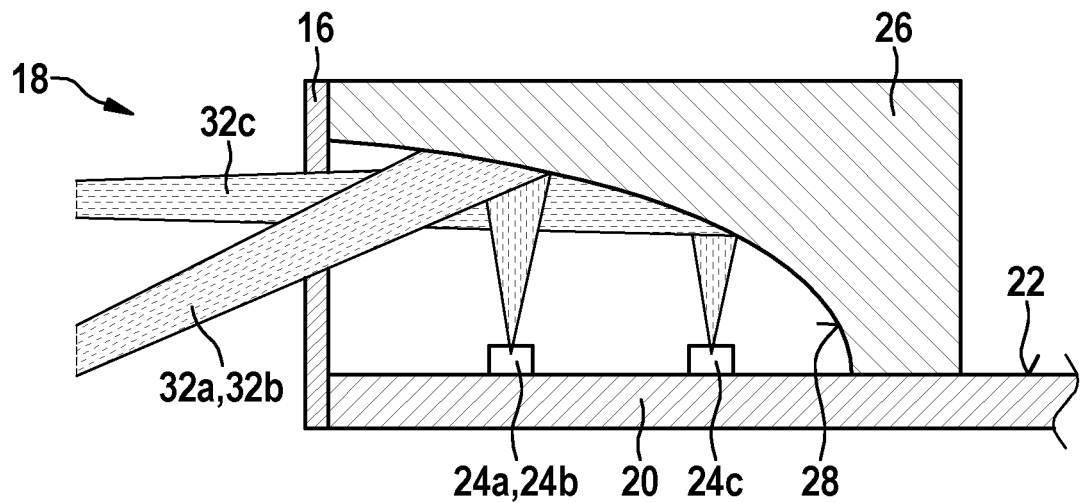

FIG. 1c shows a partial cross section through the mobile apparatus in a plane oriented perpendicularly to the front wall 10 and perpendicularly to the side wall 18. As is evident in FIGS. 1b and 1c, the first transparent cover 16 is oriented in a manner inclined by an angle ≠0° and ≠180° with respect to the functional side 22 of the circuit board 20. The first transparent cover 16 can be oriented in particular perpendicularly to the functional side 22 of the circuit board 20. By means of at least one reflector 26 having at least one reflective surface 28, it is nevertheless ensured that the light emitted by the at least one light-emitting device 24a to 24c is at least partly transmitted through the first transparent cover 16. For this purpose, the at least one reflector 26 is arranged in the housing of the mobile apparatus in such a way that the light emitted by the at least one light-emitting device 24a to 24c and deflected by means of the at least one reflective surface 28 of the at least one reflector 26 at least partly impinges on the first transparent cover 16.

On account of the equipment of the mobile apparatus with the at least one reflector 26, the functional side 22 of the circuit board 20 can be arranged parallel to the front wall 10 in the housing of the mobile apparatus, and the first transparent cover 16 arranged at the side wall 18 can nevertheless be used as a "light exit window" for the light emitted by the at least one light-emitting device 24a to 24c. The equipment of the mobile apparatus with the at least one reflector 26 thus firstly facilitates the arrangement of the circuit board 20 in the housing of the mobile apparatus and at the same time increases a design freedom in the positioning of the first transparent cover 16 at the mobile apparatus.

In the embodiment in FIGS. 1a to 1e, the mobile apparatus comprises only a single reflector 26. The single reflector 26 is advantageously a freeform reflector 26 (Freeform Reflector) and is arranged at or adjacent to the functional side 22 of the circuit board 20 in such a way that the light emitted by the at least one light-emitting device 24a to 24c impinges on the reflective surface 28 of the freeform reflector 26. The reflective surface 28 of the freeform reflector 26 can be shaped in particular such that at least one light beam 32a to 32b impinging on the reflective surface 28 of the freeform reflector 26 is focused with a desired focal length with respect to the first transparent cover 16 outside the housing of the mobile apparatus. The focal length can be for example in the range of millimeters, in particular between 4 and 6 mm. This enables a diverse usability of a light emitted through the first transparent cover 16 for sensor systems.

In the embodiment in FIGS. 1a to 1e, the reflective surface 28 of the freeform reflector 26 is mirror-symmetrical relative to a plane of symmetry 30 oriented perpendicularly to the functional side 22 of the circuit board 20. Moreover, the mobile apparatus comprises (at least) a first light-emitting device 24a and a second light-emitting device 24b as its at least one light-emitting device 24a to 24c arranged on the functional side 22 of the circuit board 20, wherein the first light-emitting device 24a is arranged mirror-symmetrically with respect to the second light-emitting device 24b relative to the plane of symmetry 30. In this way, it is ensured that a first light beam 32a emitted by the first light-emitting device 24a and reflected at the reflective surface 28 of the freeform reflector 26, relative to the plane of symmetry 30, is oriented mirror-symmetrically with respect to a second light beam 32b emitted by the second light-emitting device 24b and reflected at the reflective surface 28 of the freeform reflector 26. The light beams 32a and 32b reflected at the reflective surface 28 of the freeform reflector 26 thus also have the same inclination angle $\alpha_{OP}$ (not schematically depicted in FIG. 1c) with respect to the functional side 22 of the circuit board 20 and the same inclination angle $\beta_{OP}$ (also not depicted in FIG. 1c) with respect to the plane of symmetry 30.

The mobile apparatus in FIGS. 1a to 1e additionally also comprises a third light-emitting device 24c on the functional side 22 of the circuit board 20, wherein the plane of symmetry 30 extends centrally through the third light-emitting device 24c. Advantageously, the reflective surface 28 of the freeform reflector 26 is shaped in such a way that a third light beam 32c emitted by the third light-emitting device 24c and reflected at the reflective surface 28 of the freeform reflector 26 is at a smaller inclination angle $\alpha_{IP}$ with respect to the functional side 22 of the circuit board 20 than the first light beam 32a and the second light beam 32b. Moreover, the third light beam 32c reflected at the reflective surface 28 of the freeform reflector 26 lies in the plane of symmetry 30.

Figure 1D:
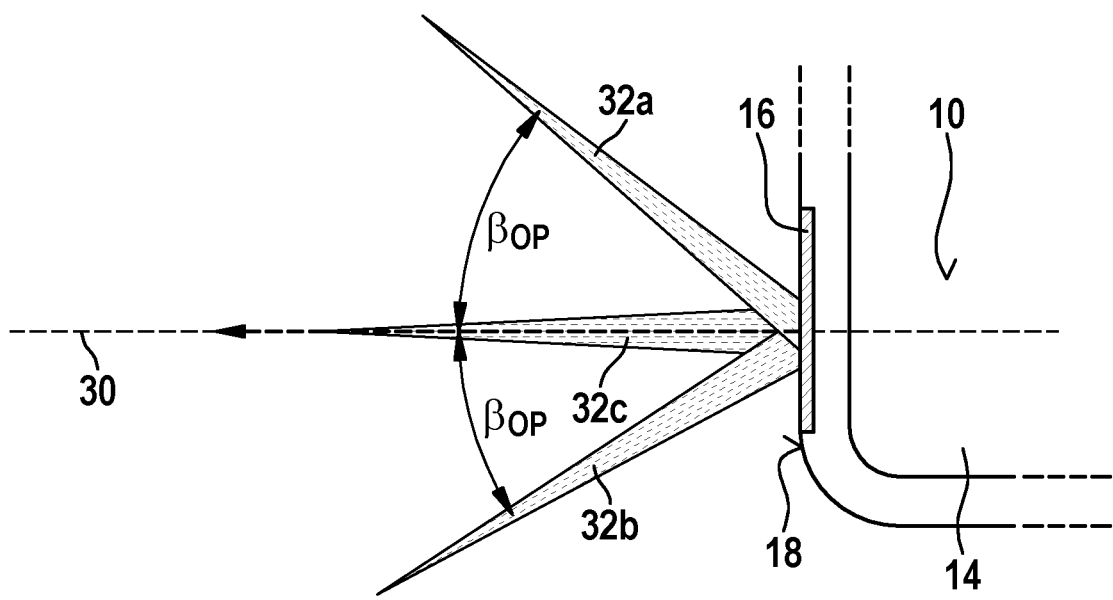
Figure 1E:
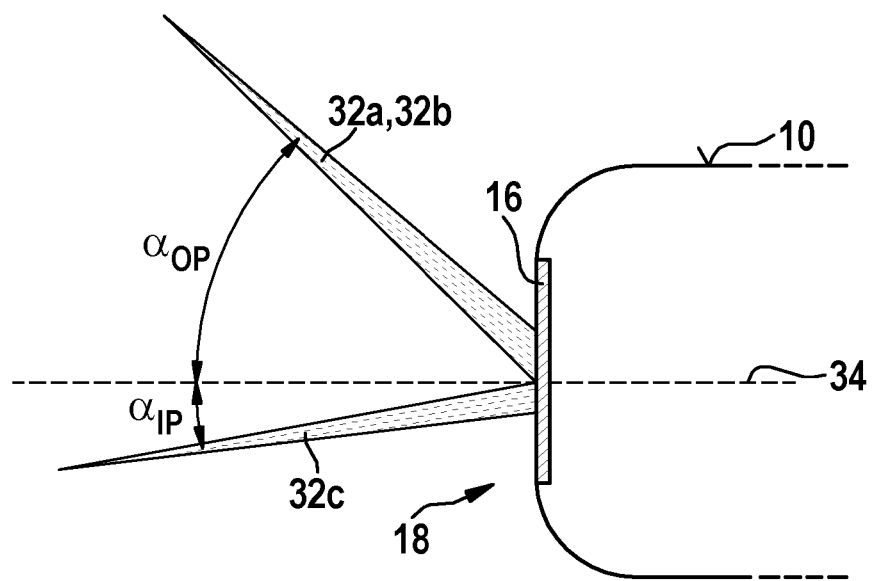

FIGS. 1d and 1e each show a partial environment of the mobile apparatus adjacent to the first transparent cover 16, wherein a plane of the drawing in FIG. 1d is oriented perpendicularly to the plane of symmetry 30, while the plane of symmetry 30 is the plane of the drawing in FIG. 1e. A line in FIG. 1e represents a center plane 34 intersecting the mobile apparatus centrally and oriented perpendicularly to the front wall 10 and perpendicularly to the side wall 18. The center plane 34 is thus oriented parallel to the functional side 22 of the circuit board 20.

The transmission of the light beams 32a to 32b through the first transparent cover 16 from the housing of the mobile apparatus has (substantially) no effect on the prior orientation of the light beams 32a to 32b. The light beams 32a and 32b emerging through the first transparent cover 16 remain mirror-symmetrical relative to the plane of symmetry 30 and thus still have the same inclination angle $\beta_{OP}$ with respect to the plane of symmetry 30 and the same inclination angle $\alpha_{OP}$ with respect to the center plane 34, i.e. with respect to the functional side 22 of the circuit board 20. The third light beam 32c emerging from the housing of the mobile apparatus still lies in the plane of symmetry 30 and has the smaller inclination angle $\alpha_{IP}$ with respect to the center plane 34 in comparison with the inclination angle $\beta_{OP}$ of the light beams 32a to 32b. The first light beam 32a and the second light beam 32b are therefore able to be designated as "out-of-plane light beams," while the third light beam 32c can be designated as an "in-plane light beam." In the example in FIG. 1e, the inclination angle $\alpha_{IP}$ is a "positive angle," but the inclination angle $\alpha_{IP}$ can also be a "negative angle," i.e. lie on the other side of the center plane 34.

The orientation of the light beams 32a to 32c that is represented pictorially in FIGS. 1d and 1e allows an advantageous use of the light beams 32a to 32c for a sensor system, for example for a sensor system for detecting (dust)

particles in the surroundings of the mobile apparatus. The light beams 32a to 32c emitted into the surroundings are thus diversely usable.

Figure 2:
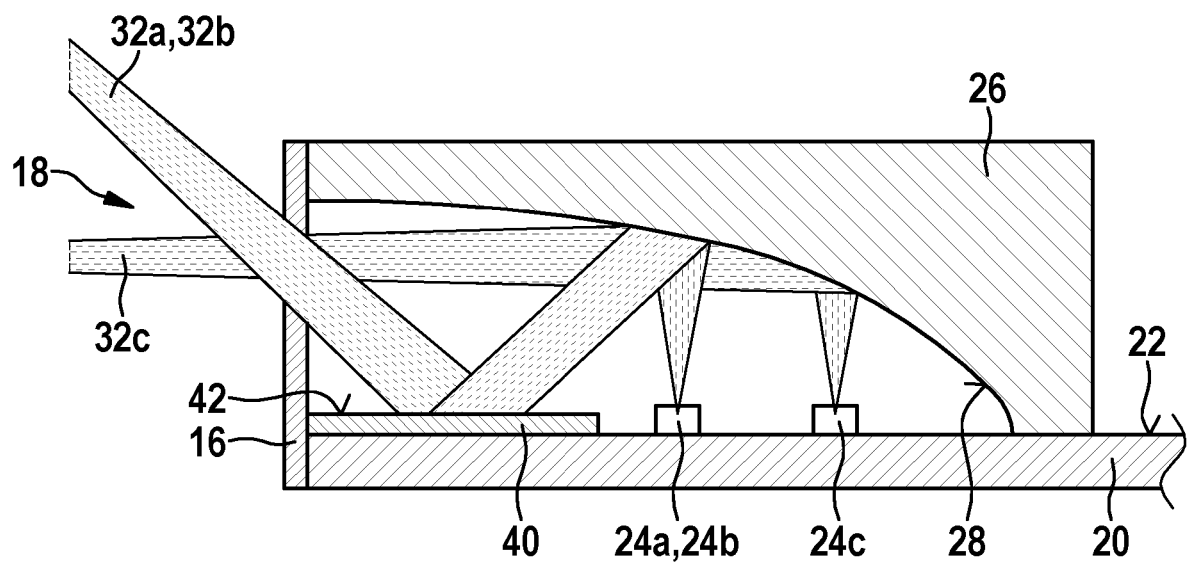
FIG. 2 shows a cross section of a second embodiment of the mobile apparatus.

FIG. 2 shows a cross section of a second embodiment of the mobile apparatus.

The cross section represented in FIG. 2 is oriented perpendicularly to the front side 10 and perpendicularly to the side wall 18. As sole supplementation to the embodiment described above, the mobile apparatus in FIG. 2, in addition to the freeform reflector 26, also comprises a planar reflector 40 arranged in the housing of the mobile apparatus in such a way that its planar reflective surface 42 is oriented parallel to the functional side 22 of the circuit board 20. The planar reflector 40 can be mounted in particular on the functional side 22 of the circuit board 20.

Only the mirror-symmetrical light beams 32a and 32b are deflected by the reflective surface 28 of the freeform reflector 26 in such a way that they impinge on the planar reflective surface 42 of the planar reflector 40. The mirror-symmetrical light beams 32a and 32b are then mirrored onto the first transparent cover 16 by means of the planar reflective surface 42 of the planar reflector 40. The mirroring of the light beams 32a and 32b has (substantially) no influence on their inclination angle $\beta_{OP}$ with respect to the plane of symmetry 30 and their inclination angle $\alpha_{OP}$ with respect to the functional side 22 of the circuit board 20. The third light beam 32c is deflected directly onto the first transparent cover 16 by means of the reflective surface 28 of the freeform reflector 26. In the case of the mobile apparatus in FIG. 2 as well, the emitted first light beam 32a and the emitted second light beam 32b can be designated as "out-of-plane light beams," while the emitted third light beam 32c is definable as an "in-plane light beam".

Figure 3:
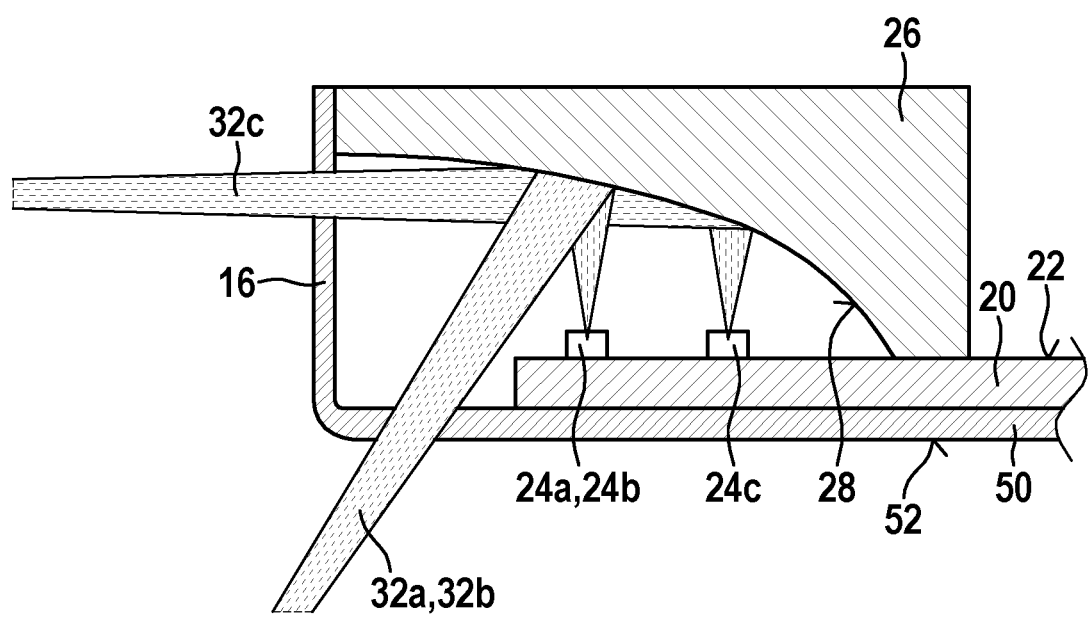
FIG. 3 shows a cross section of a third embodiment of the mobile apparatus.

FIG. 3 shows a cross section of a third embodiment of the mobile apparatus.

The mobile apparatus in FIG. 3, which is represented by means of a cross section oriented perpendicularly to the front side 10 and perpendicularly to the side wall 18, as a supplementation to the embodiment in FIGS. 1a to 1e, also comprises a second transparent cover 50, which forms at least one partial region of a housing wall of the housing, said housing wall being able to be designated as rear wall 52. The second transparent cover 50 is thus arranged on a side of the circuit board 20 which is directed away from the functional side 22 of the circuit board 20. The second transparent cover 50, too, can be embodied as a "light window" or as a "transparent housing wall component." The second transparent cover 50 can be composed e.g. of glass and/or at least one plastic.

In the case of the mobile apparatus in FIG. 3 as well, the third light beam 32c is deflected onto the first transparent cover 16 by means of the reflective surface 28 of the freeform reflector 26. However, the mirror-symmetrical light beams 32a and 32b are deflected onto the second transparent cover 50 by means of the reflective surface 28 of the freeform reflector 26. The light emitted by the light-emitting devices 24a to 24c and reflected by means of the reflective surface 28 of the freeform reflector 26 is therefore emitted partly through the first transparent cover 16 and partly through the second transparent cover 50. Thus, by means of the emitted light, measurements can be carried out simultaneously at different locations in the surroundings of the mobile apparatus.

In an alternative embodiment, also in addition to the first transparent cover 16 and/or the second transparent cover 50, yet another transparent cover can lie at the front wall 10, wherein at least one light beam passes through the further transparent cover. If the second transparent cover 50 is dispensed with in this case, at least one further functional element, such as e.g. a touchscreen element, can also be arranged between the rear wall 52 and the circuit board 20.

In all the embodiments described above, the housing can have rounded corners and/or rounded edges. By way of example, a connecting piece between the first transparent cover 16 and the second transparent cover 50 can be embodied in a rounded fashion, in particular can be composed of at least one transparent material, such as e.g. glass. At least one light beam can emerge even through such a rounded corner and/or rounded edge.

The invention claimed is:

1. A mobile apparatus comprising:
   a housing having a first transparent cover, wherein the housing comprises a front wall oriented in an inclined manner with respect to a further first housing wall of the housing, and wherein at least one of an operating button, a keyboard, at least one rotary switch and a touch-sensitive screen is arranged on an outer side of the front wall;
   a circuit board having a functional side, said circuit board being arranged in the housing parallel to the front wall and the functional side being oriented toward the front wall; and
   at least one light-emitting device arranged on the functional side of the circuit board and configured for emitting light beams;
   wherein the first transparent cover is transparent to at least one partial spectrum of the light beams emitted by the at least one light-emitting device, and
   wherein
      the first transparent cover forms at least one partial region of the first housing wall of the housing;
      the first transparent cover is oriented in a manner inclined by an angle with respect to the functional side of the circuit board; and
      at least one reflector having a reflective surface is arranged in the housing in such a way that the light beams emitted by the at least one light-emitting device and deflected by means of the at least one reflective surface of the at least one reflector at least partly impinges on the first transparent cover and are at least partly transmitted through the first transparent cover; and
   a sensor system for detecting particles in surroundings of the mobile apparatus using the light beams emitted by the at least one light-emitting device and deflected by means of the at least one reflective surface of the at least one reflector.

2. The mobile apparatus as claimed in claim 1, wherein the at least one reflector of the mobile apparatus comprises a freeform reflector, wherein the freeform reflector is arranged at or adjacent to the functional side of the circuit board in such a way that the light beams emitted by the at least one light-emitting device impinges on the reflective surface of the freeform reflector.

3. The mobile apparatus as claimed in claim 2, wherein the reflective surface of the freeform reflector is mirror-symmetrical relative to a plane of symmetry oriented perpendicularly to the functional side of the circuit board, and wherein the at least one light-emitting device of the mobile apparatus comprises at least one first light-emitting device and one second light-emitting device arranged on the functional side of the circuit board, and the first light-emitting device is arranged mirror-symmetrically with respect to the second light-emitting device relative to the plane of symmetry, as a result of which a first light beam of the light beams emitted by the first light-emitting device and reflected at least at the reflective surface of the freeform reflector is oriented, relative to the plane of symmetry, mirror-symmetrically with respect to a second light beam of the light beams emitted by the second light-emitting device and reflected at least at the reflective surface of the freeform reflector.

4. The mobile apparatus as claimed in claim 3, wherein the at least one light-emitting device of the mobile apparatus additionally comprises a third light-emitting device arranged on the functional side of the circuit board, and the plane of symmetry extends centrally through the third light-emitting device, and wherein the reflective surface of the freeform reflector is shaped in such a way that a third light beam of the light beams emitted by the third light-emitting device and reflected at least at the reflective surface of the freeform reflector is at a smaller inclination angle with respect to the functional side of the circuit board than the first light beam and the second light beam.

5. The mobile apparatus as claimed in claim 1, wherein the first transparent cover is oriented perpendicularly to the functional side of the circuit board.

6. The mobile apparatus as claimed in claim 1, wherein the housing has a second transparent cover, which forms at least one partial region of a second housing wall of the housing, wherein the second housing wall is formed in an inclined manner with respect to the first housing wall, and wherein the second transparent cover is oriented in a manner inclined by an angle with respect to the functional side of the circuit board and/or is arranged on that side of the circuit board which is directed away from the functional side of the circuit board, and the light beams emitted by the at least one light-emitting device and reflected by means of the at least one reflective surface of the at least one reflector at least partially impinges on the second transparent cover and is at least partly transmitted through the second transparent cover.

7. The mobile apparatus as claimed in claim 6, wherein the second transparent cover is arranged on that side of the circuit board which is directed away from the functional side of the circuit board, and is oriented parallel to the functional side of the circuit board.

8. The mobile apparatus as claimed in claim 1, wherein the housing has a third housing wall which is inclined to the first housing wall is aligned, and wherein at least one of a control knob, a keyboard, at least one rotary switch and a touch-sensitive screen is arranged on an outer side of the third housing wall.

9. The mobile apparatus as claimed in claim 1, wherein the device is a mobile device.

10. A mobile apparatus comprising:
a housing having a first transparent cover, wherein the housing comprises a front wall oriented in an inclined manner with respect to a further first housing wall of the housing, and wherein at least one of an operating button, a keyboard, at least one rotary switch and a touch-sensitive screen is arranged on an outer side of the front wall;
a circuit board having a functional side, said circuit board being arranged in the housing parallel to the front wall and the functional side being oriented toward the front wall; and
at least one light-emitting device arranged on the functional side of the circuit board and configured for emitting light beams;

wherein the first transparent cover is transparent to at least one partial spectrum of the light beams emitted by the at least one light-emitting device, and wherein
the first transparent cover forms at least one partial region of the first housing wall of the housing;
the first transparent cover is oriented in a manner inclined by an angle with respect to the functional side of the circuit board; and
at least one reflector having a reflective surface is arranged in the housing in such a way that the light beams emitted by the at least one light-emitting device and deflected by means of the at least one reflective surface of the at least one reflector at least partly impinges on the first transparent cover and are at least partly transmitted through the first transparent cover, wherein the at least one reflector of the mobile apparatus comprises a freeform reflector, wherein the freeform reflector is arranged at or adjacent to the functional side of the circuit board in such a way that the light beams emitted by the at least one light-emitting device impinges on the reflective surface of the freeform reflector, and wherein the at least one reflector of the mobile apparatus also comprises, in addition to the freeform reflector, a planar reflector, wherein the planar reflector is arranged in such a way that a planar reflective surface of the planar reflector is oriented parallel to the functional side of the circuit board, and at least one light beam of the light beams reflected at the reflective surface of the freeform reflector impinges on the planar reflective surface of the planar reflector.

11. The mobile apparatus as claimed in claim 10, wherein the reflective surface of the freeform reflector is mirror-symmetrical relative to a plane of symmetry oriented perpendicularly to the functional side of the circuit board, and wherein the at least one light-emitting device of the mobile apparatus comprises at least one first light-emitting device and one second light-emitting device arranged on the functional side of the circuit board, and the first light-emitting device is arranged mirror-symmetrically with respect to the second light-emitting device relative to the plane of symmetry as a result of which a first light beam of the light beams emitted by the first light-emitting device and reflected at least at the reflective surface of the freeform reflector is oriented, relative to the plane of symmetry, mirror-symmetrically with respect to a second light beam of the light beams emitted by the second light-emitting device and reflected at least at the reflective surface of the freeform reflector.

12. The mobile apparatus as claimed in claim 11, wherein the at least one light-emitting device of the mobile apparatus additionally comprises a third light-emitting device arranged on the functional side of the circuit board, and the plane of symmetry extends centrally through the third light-emitting device, and wherein the reflective surface of the freeform reflector is shaped in such a way that a third light beam of the light beams emitted by the third light-emitting device and reflected at least at the reflective surface of the freeform reflector is at a smaller inclination angle with respect to the functional side of the circuit board than the first light beam and the second light beam.

* * * * *